United States Patent [19]
DeMichael et al.

[11] Patent Number: 5,109,606
[45] Date of Patent: May 5, 1992

[54] INTEGRALLY BLADED ROTOR FABRICATION OR REPAIR

[75] Inventors: Thomas DeMichael, Indiantown; Philip G. Seeley, Jupiter, both of Fla.

[73] Assignee: United Technologies Corporation, Hartford, Conn.

[21] Appl. No.: 664,148

[22] Filed: Mar. 4, 1991

[51] Int. Cl.⁵ ............................................. B23P 15/02
[52] U.S. Cl. ............................... 29/889.1; 29/402.08; 29/889.21; 29/889.23; 228/119
[58] Field of Search ............. 29/889.1, 402.08, 889.21, 29/889.23; 228/119

[56] References Cited

U.S. PATENT DOCUMENTS

| | | | |
|---|---|---|---|
| 3,590,454 | 7/1971 | Brass | 29/889.21 |
| 3,873,234 | 3/1975 | Perry | 29/889.21 |
| 4,702,673 | 10/1987 | Hansen et al. | 29/889.21 |
| 4,784,573 | 11/1988 | Ress, Jr. | 416/213 |
| 4,873,751 | 10/1989 | Walker et al. | 29/889.1 |
| 4,883,216 | 11/1989 | Patsfall | 29/889.1 |

Primary Examiner—Irene Cuda
Attorney, Agent, or Firm—Edward L. Kochey, Jr.

[57] ABSTRACT

A blade holder for holding blades on an integrally bladed rotor has two legs located outboard of the blade in its installed position. A collar on each blade has holes for bolting the collar to the holder. Visual alignment is possible and access to the blade for optical temperature scanning is provided. After bonding a blade to the rotor, rotation of the rotor to the next bonding position is possible without removal of the holder.

3 Claims, 3 Drawing Sheets

INTEGRALLY BLADED ROTOR FABRICATION OR REPAIR

TECHNICAL FIELD

The invention relates to integrally bladed rotors and in particular to installation or replacement of blades thereon.

BACKGROUND

In large gas turbine engines, both the compressor section and a turbine section are of axial flow design, and each stage comprises a disk having a plurality of airfoils mounted on its rim. These blade and disk assemblies have been produced from separate components with the disk having the blades mechanically attached. This is advantageous since it permits blades to be readily replaced, but adds substantially to the weight of the assembly and it is difficult to achieve the high strength required for high speed modern gas turbine engines.

Integrally bladed rotors have been therefore developed where the blades are an integral part of the rotor. These blades are either formed integrally with the disk or are metallurgically bonded to the disk.

U.S. Pat. No. 4,873,751 entitled "Fabrication or Repair Technique for Integrally Bladed Rotor Assembly and issued Oct. 17, 1989 to Raymond M. Walker et al shows a method of bonding the blades. In accordance with the Walker et al teaching, the blade to be bonded has a collar near the end of the blade with a bonding surface. The blade fits entirely within a tool which swallows the blade and the collar, with the bonding force applies through the gripping tool. Several problems have been discovered with such a bonding method.

The same tool holder is to be used for all of the blades. Sightly oversized blades did not fit in the holder. Undersized blades were loose within the holder and moved out of position during the bond cycle.

The set up for the bonding operation had to be torn down between cycles to remove the tool, thus losing position.

Since the tool surrounds the blade, the rotor could not be rotated to the next blade stub location. Insufficient travel was available to completely withdraw the tool. Interference between the installed blade and the tool prevented the rotation.

Visual alignment is not possible with the airfoil clamped in the blade holder.

The airfoil temperature cannot be readily monitored with the airfoil clamped in the blade holder since there is no ready access to the airfoil surface.

SUMMARY OF THE INVENTION

A damaged blade is removed by machining, leaving a protruding stub on the disk rim. A replacement blade is provided having the proper dimensions. The replacement blade also has a circumferential collar adjacent to the portion of the blade which is to be bonded to the stub.

A U-shaped blade holder is also supplied having two legs and a base. The base is bolted to the bonding machine. A collar of the replacement blade is bolted to the U-shaped blade holder legs providing rigid accurate support and visual access to the blade permitting optical temperature scanning.

The blade is positioned adjacent the stub and a force applied between the stub and the replacement blade with the force passing through the legs of the blade holder and the collar. Local heating of the bond area causes softening, metal flow and bonding. The collar is thereafter machined off the replacement blade. This same process may also be used to initially produce the integrally bladed rotor during the fabrication thereof.

DESCRIPTION OF THE PREFERRED EMBODIMENT

Figure 2:
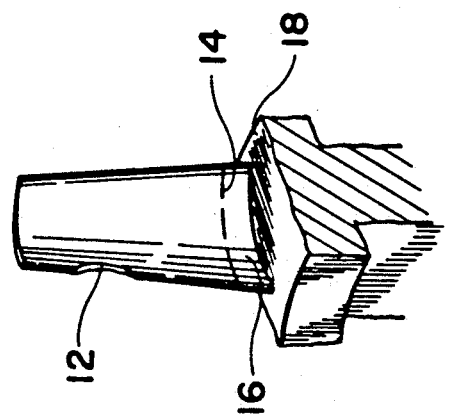
FIG. 2 shows an enlarged view of the damaged blade.
Figure 1:
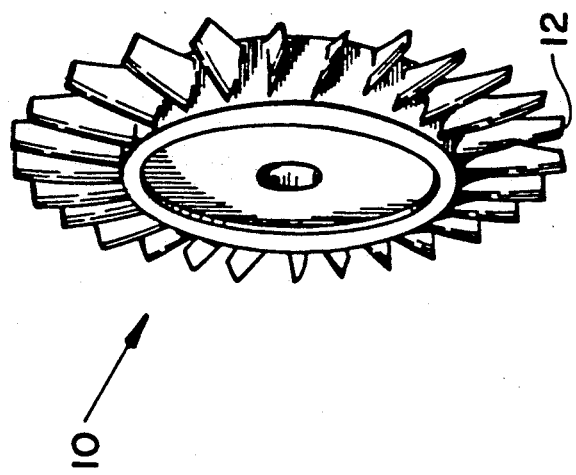
FIG. 1 shows a large bladed rotor with a damaged blade.

FIG. 1 shows an integrally bladed rotor 10 with a damaged blade 12. Referring to FIG. 2 the damaged blade is removed with a cut at phantom line at repair bond location 14 leaving a stub 16 which is machined to receive a replacement blade. The repair bond location 14 is selected so as to be near the surface 18 of rotor 10, but at a sufficient distance to avoid thermal damage to the disk during bonding, and to permit removal of bolts later described.

Figure 3:
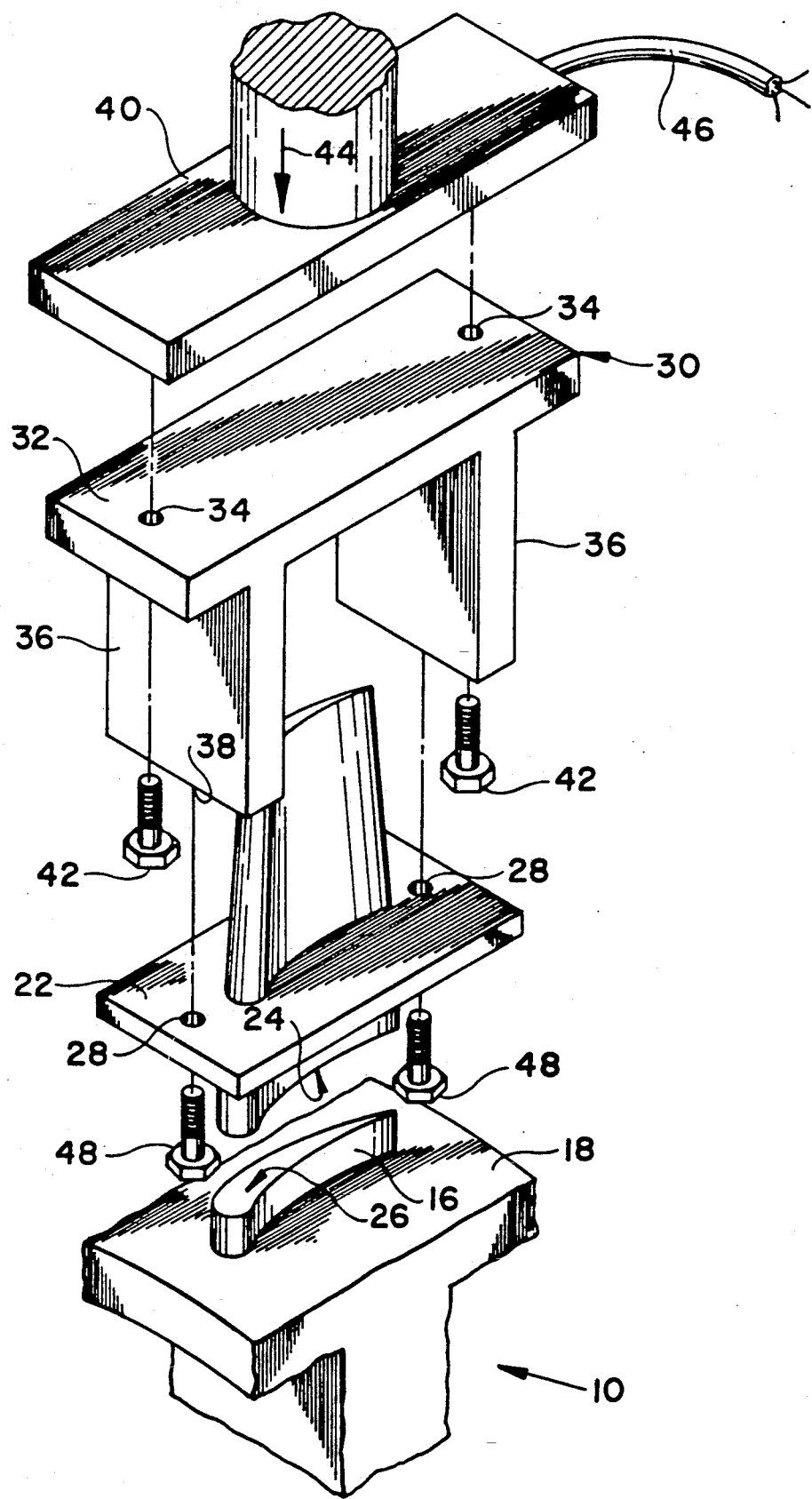
FIG. 3 shows an exploded view of the invention apparatus for blade repair.

Referring to FIG. 3 a replacement blade 20 is fabricated with collar 22 circumferentially surrounding the blade adjacent the surface 24 which is to be bonded to the surface 26 on stub 16. Two bolt holes 28 are located in the collar 22. A U-shaped blade holder 30 has a base 32 extending outwardly with two bolt holes 34 located in the base. The blade holder also has two legs 36 with tapped holes 38 in the lower end.

The blade holder is secured to the bonding machine 40 by bolts 42. This bonding machine has the capability of providing the required forging force 44 and has a power source 46 for heating the bond joint, preferably by resistance or induction heating.

Bolts 48 passing through the holes 28 into tapped openings 38 secure the replacement blade precisely and rigidly to the blade holder. The surface of the collar 22 is easily machined to an accurate smooth surface for contact with the bottom surface of the legs. The relative dimension between this upper machine surface and the lower bond surface 24 may be easily held.

The replacement blade 20 is positioned adjacent the stub with surfaces 24 and 26 in contact. The force 44 is applied through the legs 36 to collar 22 while simultaneously the local heating is applied to the bond joint area. This causes softening, metal flow and bonding at the joint. Bolts 48 are removed disengaging the blade holder making it available for the installation of another blade. The collar is thereafter machined off the replacement blade.

Both legs 36 are located outboard of the blade in the installed position. After removing bolts 48 the rotor may be rotated for installation of a blade at the next location. Removal of the blade holder from the bonding machine is not required.

Figure 4:
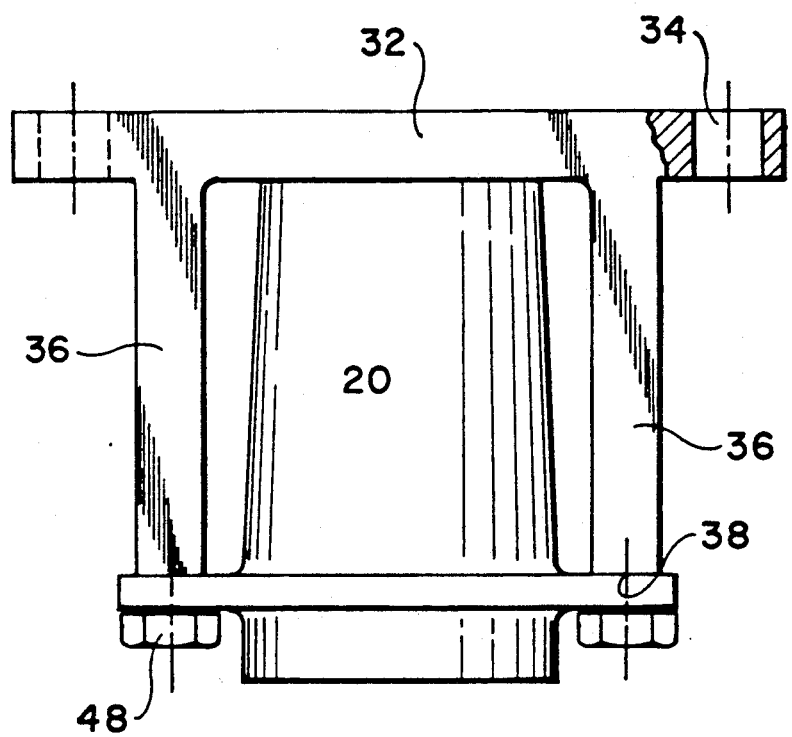
FIG. 4 shows a side view of the blade holder supporting the replacement blade.

FIG. 4 is an illustration of the blade holder with the blade secured therein.

For the initial fabrication of an integrally bladed rotor, the disk is first fabricated with the plurality of projecting stubs 16. Blade preforms rather than replacement blades are used with the identical operation being carried out repeatedly for the various blades to be bonded to the rotor.

We claim:

1. A method for replacing a blade on an integrally bladed rotor, which comprises a disk having a plurality of integral blades projecting from the rim of the disk, including the steps of:
   a) removing a pre-existing blade, leaving a blade stub portion of said preexisting blade projecting from the disk rim, said blade stub having a face which constitutes a surface to which a replacement blade will be bonded;
   b) forming a replacement blade with a proposed bond surface, a collar about the periphery of said blade adjacent said proposed bond surface and bolt holes through said collar;
   c) securing said blade to a U-shaped blade holder, having two legs and a base, by bolting said blade through said bolt holes to the ends of the legs of said U-shaped blade holder;
   d) securing the base of said base holder to a bonding machine;
   e) positioning said replacement blade adjacent said blade stub;
   f) applying a force against said stub and said replacement blade with said force being applied to the replacement blade through the legs of said U-shaped holder and said collar;
   g) locally heating said intended bond surface, between said stub and said replacement blade, to a temperature which causes softening, metal flow and bonding; and
   h) removing said collar from said replacement blade by machining.

2. A method for fabricating an integrally bladed rotor which comprises a disk having a plurality of integral blades projecting from the rim of the disk including the steps of:
   a) providing a disk having a plurality of projecting stubs;
   b) providing a plurality of blade preforms, each preform having a proposed bond surface, a collar about the periphery of said blade adjacent said proposed bond surface and bolt holes through said collar;
   c) securing to a bonding machine the base of a U-shaped blade holder having two legs and a base;
   d) the securing of a blade to said U-shaped blade holder by bolting said blade through said bolt holes to the ends of the legs of said U-shaped bolt holder;
   e) a positioning said replacement blade adjacent said stub;
   f) applying a force between said stub and said blade preform with said force being applied through said legs and said collar;
   g) locally heating said intended bond surface between said stub and said blade preform, to a temperature which causes softening, metal flow and bonding to cause bonding and then allowing the bond to cool;
   h) removing said collar from said blade by machining; and
   i) repeating steps d, e, f, and g until all stubs have blades attached thereto.

3. The method of claim 2 including also;
   locating said legs of said blade holder outboard of the installed position of each blade preform.

* * * * *